Oct. 18, 1960   HANS-JOACHIM M. FOERSTER   2,956,449
TRANSMISSION WITH FLUID COUPLING
Filed Oct. 8, 1956
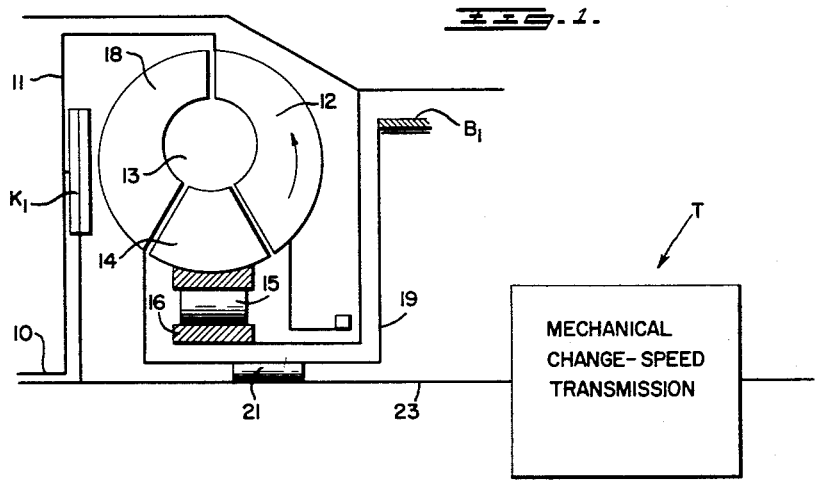
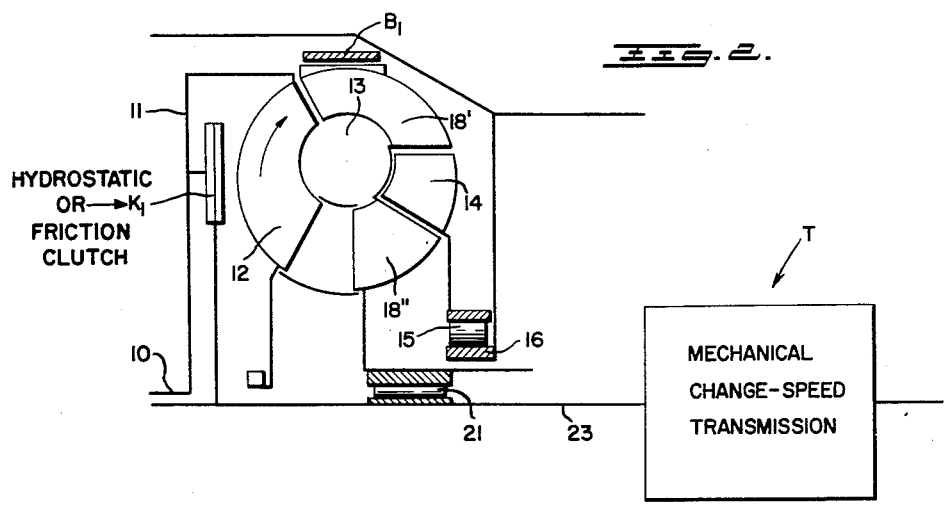
INVENTOR
HANS-JOACHIM M. FÖRSTER
BY *Dicke and Craig*
ATTORNEYS

United States Patent Office 2,956,449
Patented Oct. 18, 1960

2,956,449

TRANSMISSION WITH FLUID COUPLING

Hans-Joachim M. Foerster, Stuttgart-Bad Cannstatt, Germany, assignor to Daimler-Benz Aktiengesellschaft, Stuttgart-Unterturkheim, Germany Filed Oct. 8, 1956, Ser. No. 614,471

Claims priority, application Germany Oct. 25, 1955

11 Claims. (Cl. 74—730)

The present invention relates to a drive with a hydraulic power transfer unit such as a fluid coupling or torque converter connected ahead of the change-speed transmission and with a clutch bridging or by-passing the hydraulic unit.

In particular, the present invention is an improvement over my copending United States application Serial No. 560,647, filed January 23, 1956 and entitled "Speed-Change Transmission," the subject matter of which is incorporated herein by reference.

The aforementioned copending application describes an arrangement in which the turbine wheel of the torque converter which may be disengaged from the change-speed gear is adapted to be braked so that it may effectively brake the transmission upon engagement of a speed by-passing the torque converter. The entire brake energy is thereby dissipated in the torque converter which, as a result thereof, may be thermally loaded very highly in certain cases.

In the aforementioned copending application, the turbine wheel of the hydrodynamic unit was directly connected in a certain "hydraulic" speed or speeds over a freewheeling device with a transmission member of the change-speed transmission connected behind the hydrodynamic unit or device so that with the clutching or coupling of the turbine wheel with the change-speed transmission over the freewheeling device a predetermined shifting position or speed of the mechanical change-speed transmission was always simultaneously and necessarily connected thereby limiting the speeds of the change-speed transmission with which the hydrodynamic device could be used.

Furthermore, the aforementioned copending application also proposed in connection with a change-speed transmission to provide for purposes of braking the turbine wheel, disengageable from the change-speed transmission, a hydrostatic brake and/or a hydrostatic by-pass or bridging clutch for purposes of by-passing the torque converter.

The present invention is a further development and improvement of such transmissions, and consists essentially in that the turbine wheel of the hydraulic device which is adapted to be braked by itself is adapted to be disengageably clutched directly with the shaft member which connects the by-pass clutch with the change-speed transmission, preferably by means of a freewheeling device.

The present invention, among others, offers the advantage that the use of the hydraulic unit, such as a hydraulic coupling or torque converter, is not limited to a predetermined shifting position of the change-speed transmission and that any desired change-speed transmission may be connected behind the hydraulic unit in that the drive may take place over the hydraulic unit as well as over the by-pass or bridging clutch in any of the speeds of the following change-speed transmission.

The braking of the transmission over the turbine thereby offers the advantage that the circulation of the fluid medium, such as the oil of the hydraulic unit, may take place during the braking condition also in the same direction as during normal operation of the hydraulic unit. This condition is particularly important if a non-symmetrical blading arrangement or vanes of the hydraulic unit is provided. Moreover, the braking may be carried out independently of the shifting of the transmission so that nothing needs to be changed with the normal shifting control arrangement of the change-speed transmission.

Since the by-pass clutch has to dissipate itself only a fraction of the output or energy decreased by the braking action and since the largest part of the braking energy is dissipated in the hydraulic unit, a friction clutch, such as a friction disk clutch, may also be used as the by-pass clutch instead of a hydrostatic clutch since the required dissipation of the braking energy may be obtained by slippage of the friction clutch. Thus, a very simple constructional element may be used as by-pass clutch, especially if the clutch is completely immersed in oil and is thereby sufficiently cooled in order to absorb the part of the braking work falling thereon.

For purposes of braking the turbine wheel which, for example, may be formed as a two-stage turbine wheel, a brake may be provided which acts directly thereon.

Accordingly, it is an object of the present invention to provide a transmission in which the hydraulic unit which is followed by a mechanical change-speed transmission may be used with any setting of the mechanical change-speed transmission regardless of the particular speed engaged therein.

Another object of the present invention resides in the provision of a transmission including a hydrodynamic unit followed by a mechanical change-speed transmission in which the hydrodynamic unit may be used for purposes of braking the vehicle regardless of the particular speed engaged in the mechanical change-speed transmission.

It is a still further object of the present invention to provide a combined hydrodynamic and mechanical change-speed transmission which is highly versatile as regards operational possibilities.

Another object of the present invention resides in an arrangement of a combination hydrodynamic and mechanical change-speed transmission in which a clutch is provided by-passing the hydrodynamic unit which may be constructed as a simple friction disk clutch, preferably immersed in a cooling fluid, in which the part of braking energy falling thereon when the hydrodynamic unit is used as brake, is dissipated by slippage.

Further objects, features and advantages of the present invention will become more obvious from the following description when taken in connection with the accompanying drawing which shows, for purposes of illustration only, two embodiments in accordance with the present invention, and wherein:

Figure 1 is a first embodiment in accordance with the present invention of a transmission arrangement provided with a single turbine wheel and a brake structurally separate therefrom, and Figure 2 is a second embodiment of a transmission in accordance with the present invention provided with a two-stage turbine wheel and with a brake directly acting thereon.

Referring now to the drawing wherein like reference numerals are used throughout the various views and more particularly to Figure 1, reference numeral 10 designates the drive shaft driven, for example, by the engine crank shaft, which transmits the engine output over the rotating clutch housing 11 which may simultaneously form the flywheel to the pump or impeller wheel 12 of the hydraulic unit 13 which operates as a torque converter. The guide wheel 14 is thereby supported over a freewheeling device 15 against a part 16 rigidly secured at the stationary housing part in such a manner as to prevent rotation of the guide wheel 14 in a direction opposite to the normal forward direction of rotation, as is well known in connection with torque converters.

In Figure 1, the turbine wheel 18 is connected with a hollow shaft 19 which may be braked by means of a brake $B_1$. A freewheeling device 21 supports the hollow shaft 19 at the shaft 23 constituting simultaneously the output shaft of the hydrodynamic unit and the input shaft of the following mechanical change-speed transmission generally designated by reference character T. The shaft 23 is connected, on the one hand, by means of a hydrostatic or oil-immersed friction disk clutch $K_1$ with the engine drive shaft 10 and therewith simultaneously with the pump wheel 12 over the rotating clutch housing 11, and, on the other, with the driving input member of any suitable change-speed transmission T which is connected behind the hydraulic unit illustrated therein. The change-speed transmission T following the hydraulic unit may be of any suitable type such as countershaft transmission or planetary gearing transmission.

For example, the mechanical change-speed transmission may be of the type illustrated in my aforementioned copending application in which the shaft 23 is connected to the sun gear of a first planetary gearing, which sun gear may be selectively clutched to the ring gear of the first planetary gear, while the planet carrier thereof is connected to the ring gear of the second planetary gearing. The ring gear of the first planetary gear is also adapted to be selectively braked to obtain a reverse speed or adapted to be selectively clutched with the sun gear of the second planetary gear. The sun gear of the second planetary gear in turn is adapted to be selectively braked or adapted to be selectively clutched to the ring gear thereof. The planet carrier of the second planetary gear is connected to the output or driven shaft of the mechanical change-speed transmission.

However, it is understood that any other suitable mechanical change-speed transmission of the prior art may be used, such as one having a countershaft transmission providing a plurality of forward and reverse speeds, a combined countershaft and planetary gear transmission, or a single planetary gear of appropriate construction, for example, with twin planet gears, etc.

If the clutch $K_1$ is disengaged, then the drive from the engine shaft 10 takes place over the pump or impeller wheel 12 of the torque converter 13 to the turbine wheel 18, and from there over the freewheeling device 21 to the transmission input shaft 23, whereby any desired speed may be engaged in the change-speed transmission which follows the hydraulic unit.

The drive, instead of taking place over the hydraulic unit 13, may also take place in by-passing relationship thereto in that the engine drive shaft is clutched directly with the transmission input shaft 23 by means of the by-pass or bridging clutch $K_1$. The freewheeling device 21 thereby interrupts the driving connection between the turbine wheel 18 of the torque converter 13 and the transmission input shaft 23 to enable the shaft 23 to overtake the turbine wheel 18 in the normal forward direction of rotation.

If the drive, for example, of a vehicle, is to be braked then this may take place with an engaged clutch $K_1$ by engagement of the brake $B_1$, i.e., tightening of the brake band. The brake $B_1$ thereby acts effectively over the torque converter 13 and the by-pass or bridging clutch $K_1$ on the transmission input shaft 23 and from there back on the drive at the wheels of the vehicle. The hydraulic medium thereby flows through the torque converter in the same direction as during normal operation so that a most favorable braking effect is attained.

The clutch $K_1$ may, therefore, be kept very small and of light weight owing to the fact that the essential part of the braking energy is dissipated in the torque converter.

The embodiment according to Figure 2 differentiates itself from that of Figure 1 only in that a two-stage turbine wheel 18′, 18″ is provided instead of the one-stage turbine wheel 18 of Figure 1.

Furthermore, the brake $B_1$ acts directly on the turbine wheel 18′. The direction of circulation of the fluid medium is thereby assumed in the opposite direction of rotation as in the case of the embodiment according to Figure 1 due to the rearrangement of the impeller wheel 12. However, as to the rest, the operation of the embodiment according to Figure 2 is the same as in the embodiment described in connection with Figure 1. The mechanical change-speed transmission T of Figure 2 may also be of any suitable type as described in connection with Figure 1.

The present invention is applicable for any suitable purpose, however, especially to motor vehicles, rail vehicles, or the like. If so desired, the shaft 23 may also serve as immediate drive of the element to be driven without the insertion of a change-speed transmission.

As mentioned hereinabove, any desired change-speed transmission is suitable for connection with the shaft 23 of Figures 1 and 2 in accordance with the present invention, including such a transmission as illustrated in the aforementioned copending application. The hydraulic units 13 may also be of any suitable type known in the prior art.

While I have shown and described two preferred embodiments in accordance with the present invention, it is understood that the same is not limited thereto but is susceptible of many changes and modifications within the spirit of the present invention, and I intend to cover all such changes and modifications except as defined by the appended claims.

I claim:

1. A change-speed transmission comprising a hydraulic unit including input means, impeller means connected to said input means, turbine means hydraulically coupled to said impeller means, output means for said hydraulic unit, mechanical change-speed gear means having only one input connection, said connection being connected only to said output means, first means providing a one-way coupling of said turbine means to said output means, second means disengageably coupling said input means to said output means, and third means applying a braking force directly to said turbine means to thereby brake said mechanical change-speed gear means over a force transmission chain comprising said impeller means, said second means and said output means while said second means effectively couples said input means to said output means.

2. A change-speed transmission according to claim 1, wherein said hydraulic unit is a torque converter with guide vanes and means preventing rotation of said guide vanes in a direction opposite to the normal direction of rotation.

3. A change-speed transmission according to claim 1, wherein said hydraulic unit is a hydrodynamic power transmitting device with non-symmetrically arranged blades.

4. A change-speed transmission according to claim 1, wherein said turbine means forms a single-stage turbine wheel.

5. A change-speed transmission according to claim 1, wherein said turbine means forms a two-stage turbine.

6. A change-speed transmission according to claim 5, wherein said third means is operative to apply a braking force directly to one of said two stages of said turbine means.

7. A change-speed transmission according to claim 1, wherein said second means is a relatively small disk clutch effectively by-passing said hydraulic unit.

8. A change-speed transmission according to claim 7, wherein said disk clutch is immersed in oil.

9. A change-speed transmission according to claim 1, wherein said second means is a hydrostatic coupling.

10. A change-speed transmission having a hydrodynamic unit including a driving member and a driven member, an output member, one-way drive means disengageably connecting said driven member with said output member, means disengageably connecting said driving member to said output member, mechanical change-speed gear means connected at its input only to said output member, and means for applying a braking force on said driven member to effectively brake said mechanical change-speed gear means upon engagement of said second-mentioned means regardless of the speed engaged therein.

11. A change-speed transmission according to claim 10, wherein said second-mentioned means is a relatively small disk clutch immersed in oil to dissipate the braking energy falling thereon by slippage between the disks.

References Cited in the file of this patent

UNITED STATES PATENTS

| | | |
|---|---|---|
| 2,397,634 | Voytech | Apr. 2, 1946 |
| 2,687,657 | Kugel et al. | Aug. 31, 1954 |
| 2,695,533 | Pollard | Nov. 30, 1954 |
| 2,738,689 | Dodge | Mar. 20, 1956 |
| 2,835,145 | Carp | May 20, 1958 |